United States Patent [19]
Shotton, Jr.

[11] 3,826,184
[45] July 30, 1974

[54] CONVEYOR-TYPE COOKING DEVICE
[76] Inventor: Thomas E. Shotton, Jr., 211 Fayette St., Suffolk, Va. 23434
[22] Filed: Sept. 26, 1972
[21] Appl. No.: 292,284

[52] U.S. Cl. .................................. 99/404, 99/407
[51] Int. Cl. ............................................ A47j 37/12
[58] Field of Search.......... 99/404, 334, 406, 443 R, 99/443 C, 337; 198/213

[56] References Cited
UNITED STATES PATENTS

| | | | |
|---|---|---|---|
| 1,644,516 | 10/1927 | Ehrhart | 99/406 |
| 2,057,366 | 10/1936 | Chapman | 99/404 |
| 2,084,059 | 6/1937 | McPherson | 99/334 X |
| 2,517,833 | 8/1950 | Bourland | 99/443 C X |
| 2,709,955 | 6/1955 | Hunter | 99/443 C X |
| 2,853,937 | 9/1958 | Peck | 99/404 |
| 3,590,725 | 7/1971 | Bilynsky | 99/334 |

FOREIGN PATENTS OR APPLICATIONS

| | | | |
|---|---|---|---|
| 720,710 | 5/1942 | Germany | 99/404 |
| 806,120 | 6/1951 | Germany | 99/443 R |

Primary Examiner—Edward L. Roberts
Assistant Examiner—Arthur O. Henderson
Attorney, Agent, or Firm—Griffin, Branigan and Butler

[57] ABSTRACT

Described herein is a conveyor-type cooking device comprising two vertically-disposed auger conveyor systems, an oil-flow/oil-heating system, and an automatic conveyor control system. Each of the auger conveyor systems includes a perforate auger situated inside a cylinder housing. One of the perforate auger systems conveys downwardly and the other upwardly. The cylinder housings are serially connected at the bottoms thereof. The oil-flow/oil-heating system circulates heated oil through the serially connected cylinder housings in the same directions as the augers convey. The heating system maintains the oil at a uniformly high temperature throughout the cylinder housings. The automatic control system monitors food articles being conveyed through the cylinder housings and controls the speed at which the upwardly conveying auger rotates.

11 Claims, 2 Drawing Figures

CONVEYOR-TYPE COOKING DEVICE

BACKGROUND OF THE INVENTION

This invention relates generally to the art of cooking devices and more particularly to the art of conveyor-type cooking devices.

Conveyor-type cooking devices are used rather frequently in food processing plants for cooking food articles at high-volume rates. Such cooking devices normally utilize cooking fluids (for example hot oil) and employ conveyors (such as an auger-type conveyor). The conveyors receive food articles, convey them through the cooking fluids and deliver them to cooked-article receiving means.

In the case of one prior-art conveyor-type cooking device, which is used for cooking peanuts, an upwardly conveying auger system has a bottom end thereof positioned in a tank of hot oil. The auger system extends upwardly, on an angle, out of the oil. The auger system comprises an auger which is surrounded by a perforate cylinder housing. The housing has an inlet opening at a bottom end thereof and an outlet opening at a top end thereof. Peanuts to be cooked are dropped into the oil. The auger picks up the peanuts at the inlet opening and conveys them upwardly, on an angle, out of the oil to the outlet opening. The auger turns relatively slowly because it takes approximately 6 minutes in appropriately hot oil to cook peanuts. Most probably the reason that the auger is disposed on an angle, rather than being vertical, is to enable the slowly turning auger to lift the peanuts. A cooking machine which is quite similar to this is described in U.S. Pat. No. 754,278 to Betz et al, although this patent does not mention the use of this machine for cooking peanuts.

A difficulty with such prior-art devices is that they inherently occupy large amounts of floor space. That is, their oil tanks are unduly large to accommodate the inclined augers. Thus, it is an object of this invention to provide an auger-type cooking device which does not occupy an unduly large amount of floor space.

Another problem with many prior-art cooking devices is that they have unduly low volumn rates for their sizes. For example, in the case of the prior-art device described above the augers thereof must turn relatively slowly so that the food articles remain in the oil tanks for an appropriate length of time. Although the capacity of this prior-art conveyor-type cooking devices could be increased by increasing its size, this would mean that unduly large amounts of oil would be required and that the cooking devices would occupy even more floor space. Thus, it is another object of this invention to provide a conveyor-type cooking device for cooking at a relatively high volumn rate but yet not employing an unduly large amount of oil or occupying an unduly large amount of floor space.

Still another difficulty with some prior-art cooking devices is that it is difficult to regulate the degree to which they cook food articles. In this regard, the operators of some of these devices do not know whether their cookers are improperly adjusted until cooked food articles come out of the cooking devices. Although the operators can then make adjustments, relatively large quantities of food articles may have already been ruined. Therefore, it is still another object of this invention to provide a conveyor-type cooking device which monitors food articles as they are being cooked and, in turn, regulates the degree to which the articles are cooked.

Yet another difficulty with some prior-art conveyor-type cooking devices is that when augers thereof pick up and convey food articles, especially in the case of peanuts, they tend to break the food articles. In this regard, peanuts that have been broken into "halfs" are generally considered to be inferior to peanut "wholes" and therefore bring a lesser market price. Therefore, it is yet another object of this invention to provide a conveyor-type cooking device which does not break food articles to the extent of many prior art conveyor-type cooking devices.

Another difficulty with some prior-art conveyor-type cooking devices is that large quantities of oil are required to operate them, and such oil, after a predetermined amount of use, becomes "stale" and must be replaced. It is therefore another object of this invention to provide a conveyor-type cooking device which does not employ an unduly large amount of oil and which continually cleans the oil which it does use.

SUMMARY OF THE INVENTION

According to the principles of this invention, a conveyor-type cooker for cooking food articles in a heated liquid comprises serially-connected, downwardly and upwardly conveying, auger systems. The auger systems comprise perforate augers situated inside cylinder housings. Hot oil is circulated through the housings in the same directions as the augers convey. A monitoring means, such as a photocell, monitors the articles when they arrive at the bottom of the downwardly conveying auger system and controls the speed at which the upwardly conveying auger system conveys to insure that the articles are cooked to the proper degree.

In operation, articles to be cooked are dropped into the top of the downwardly-conveying auger system and, as these articles are conveyed through the cooking device, they are cooked by the heated oil that is circulating through the cylinder housings. The circulating oil helps the auger systems convey the articles. The perforate augers do not impede the flow of the oil. The automatic control system checks the articles for color at the bottom of the downwardly-conveying auger system and controls the speed at which the upwardly conveying auger system conveys in accordance therewith.

BRIEF DESCRIPTION OF THE DRAWING

The foregoing and other objects, features and advantages of the invention will be apparent from the following more particular description of a preferred embodiment of the invention as illustrated in the accompanying drawings. The drawings are not necessarily to scale, emphasis instead being placed upon illustrating the principles of the invention in a clear manner.

DESCRIPTION OF THE PREFERRED EMBODIMENT

Figure 1:
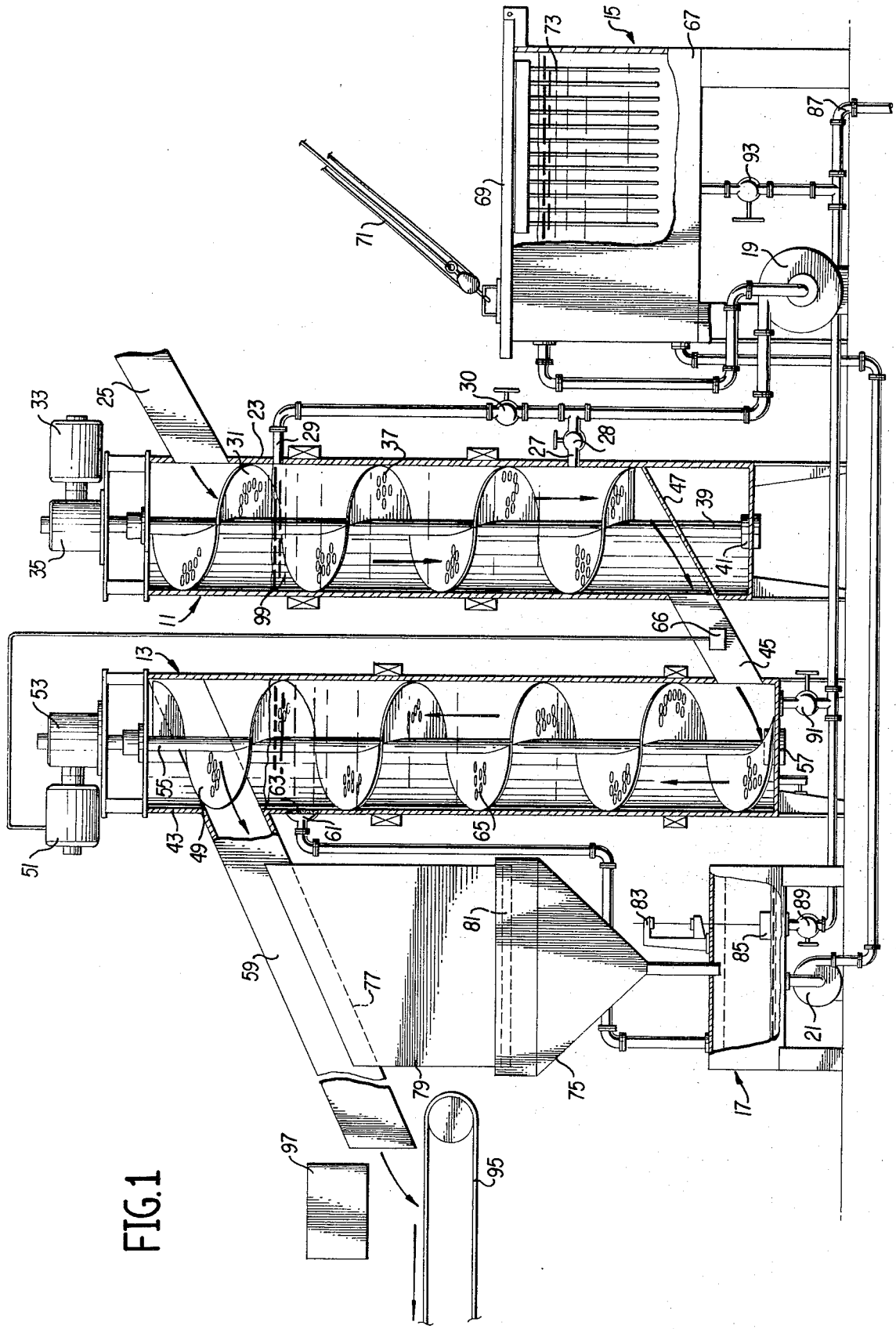
FIG. 1 is a partially cutaway side view of a first embodiment of a conveyor-type cooking device employing principles of this invention.

Referring now to FIG. 1, there is shown a conveyor-type cooking device comprising two auger cooking systems 11 and 13 and an oil-flow/oil-heating system including an oil heater 15, an oil reclaim tank 17, two oil pumps 19 and 21 and additional pipes and fittings. For ease of description, the cooking device will be described herein in relation to cooking peanuts.

The first auger cooking system 11 comprises a first cooking tank 23 which communicates with a peanut supply duct 25 and bottom and top oil inlet pipes 27 and 29. Bottom and top valves 28 and 30 are respectively used to control oil flow through the bottom and top oil flow pipes. A downwardly-conveying auger (or first auger) 31 is positioned inside the first cooking tank 23 and is rotated by a first auger drive motor 33 through gears 35. It should be noted that the downwardly-conveying auger 31 has perforations 37 in the spiral vane thereof. A first auger shaft 39 rides on bearings 41 which are inside the first cooking tank 23.

The bottom end of the first cooking tank 23 is serially connected to the bottom end of a second cooking tank 43 by means of a connecting duct 45. An inclined baffle 47 is positioned at the bottom of the first cooking tank 23 to deflect peanuts arriving at the bottom of the first cooking tank 23 through the connecting duct 45.

The second auger system 13 comprises the second cooking tank 43, and an upwardly-conveying auger (or a second auger) 49 which is driven by a second auger drive motor 51 via gears 53. A second auger shaft 55 rides in a bearing 57 positioned inside the second cooking tank 43 so that it may be continually oiled by oil inside the second tank 43. The second cooking tank 43, in addition to communicating with the connecting duct 45, also communicates with a peanut outlet chute 59 and an oil outlet fitting 61. In this regard, the oil outlet fitting 61 has a screen 63 across the face thereof to prevent peanuts from flowing into the oil outlet fitting 61. Again, the upwardly conveying auger (or second auger) 49 has perforations 65 in the spiral vane thereof.

A monitoring device 66, comprising a photocell, is positioned in the connecting duct 45 for monitoring the degree to which peanuts passing through the connecting duct 45 are cooked. The monitoring device 66, is electrically connected to the second auger drive motor 51 for controlling the speed at which the second auger system 13 conveys, in response to the degree to which the peanuts are cooked.

Turning next to the oil-flow/oil heating system, the oil heater 15 comprises an oil heater tank 67 having an oil heating tank door 69 which is opened and closed by a door lifting device 71. Attached to the oil heating tank door 69 are electrical heating coils 73 which, when the door 69 is closed, extend downwardly into oil. As can be seen in FIG. 1 the oil heating tank 67 communicates with the first cooking tank 23 via the first oil pump 19 and the bottom and top oil inlet pipes 27 and 29.

The oil reclaim tank 17 receives oil from two sources: the first source is the oil outlet fitting 61 of the second cooking tank 43; and the second source is an oil funnel 75. The oil funnel 75 captures oil falling from peanuts passing through the peanut outlet chute 59. In this regard, oil falls from the peanuts, through a perforate chute bottom 77 and passes through an oil chute 79 and a fine mesh screen filter 81, into the oil funnel 75.

The oil reclaim tank 17 communicates with the oil heater tank 67 via the second oil pump 21. In this regard, an electrical-control device 83, which is activated in response to movement of a float 85 positioned inside the oil reclaim tank 17, controls operation of the second oil pump 21.

The oil reclaim tank 17, the second cooking tank 43, and the oil heater tank 67, are respectively connected to a drain pipe 87 by means of: a reclaim-tank drain valve 89, a cooking-tank drain valve 91 and an oil-heater tank drain valve 93. By opening these three valves the system can be drained of oil.

Also shown in FIG. 1 is a peanut conveyor 95 and a peanut salter 97.

Turning now to the operation of the FIG. 1 apparatus, and describing first a cooking oil cycle, cooking oil is heated in the oil heater tank 67 by means of the electrical coils 73. This oil is pumped from the oil heater tank 67 into the first cooking tank 23 by the first oil pump 19. In this regard, an operator can cause this oil to flow through either the bottom oil inlet pipe 27 or the top oil inlet pipe 29 by regulating such oil flow with bottom and top oil flow valves 28 and 30.

Oil entering the first cooking tank 23 eventually passes through the connecting duct 45 and up through the second cooking tank 43. In this regard, the oil normally flows through the perforations 37 and 65 in the vanes of the downwardly and upwardly conveying augers 31 and 49.

Most of the oil in the second cooking tank 43 flows out of the oil outlet 61 and directly into the oil reclaim tank 17. However, some oil also falls from peanuts through the perforated chute bottom 77 into the oil reclaim tank 17 via the oil funnel 75.

When the oil in the oil reclaim tank 17 reaches a predetermined level, the electrical control device 83 activates the second oil pump 21 to pump oil from the reclaim tank 17 into the oil heater tank 67. Thus, the oil makes a complete cycle.

With regard to the path followed by peanuts as they are cooked, peanuts enter the top of the first cooking tank 23 through the peanut supply duct 25. The peanuts are conveyed downwardly by means of: the downwardly conveying auger 31; oil flow which is created by oil entering the first cooking tank 23 through the top oil inlet pipe 29; and the pull of gravity on the peanuts.

When the peanuts reach the inclined baffle 47, at the bottom of the first cooking tank 23, they are directed through the connecting duct 45. In this regard, the peanuts are caused to move through the connecting duct 45 by the pull of gravity and oil flow. With regard to oil flow, it should be noted that oil entering the first cooking tank 23 at the bottom oil inlet pipe 27 creates additional oil flow beyond this point.

Peanuts entering the bottom of the second cooking tank 43 are lifted upwardly to the peanut outlet chute 59 by: the upwardly conveying auger 49 and upward oil flow in the second cooking tank 43. The peanuts enter the peanut outlet chute 59 and are directed onto a peanut conveyor belt 95. The peanuts are then salted by a salter 97 and transported for further processing.

The monitoring device 66 examines the color of peanuts passing through the connecting duct 45 and controls the speed of the second auger drive motor 51 in response thereto. For example, if the peanuts are somewhat dark, the monitoring device 66 will order the second auger drive motor 51 to speed up the rate at which the upwardly conveying auger 49 turns so that the peanuts will be conveyed through the cooking oil in the second cooking tank 43 at a relatively fast rate of speed. On the other hand, if the monitoring device 66 notes that the peanuts are relatively light, it will order the second auger drive motor 51 to slow down the rate at which the upwardly conveying auger 49 turns so that the peanuts will thereafter be conveyed through the cooking oil in the second cooking tank 43 at a relatively slow rate of speed.

Figure 2:
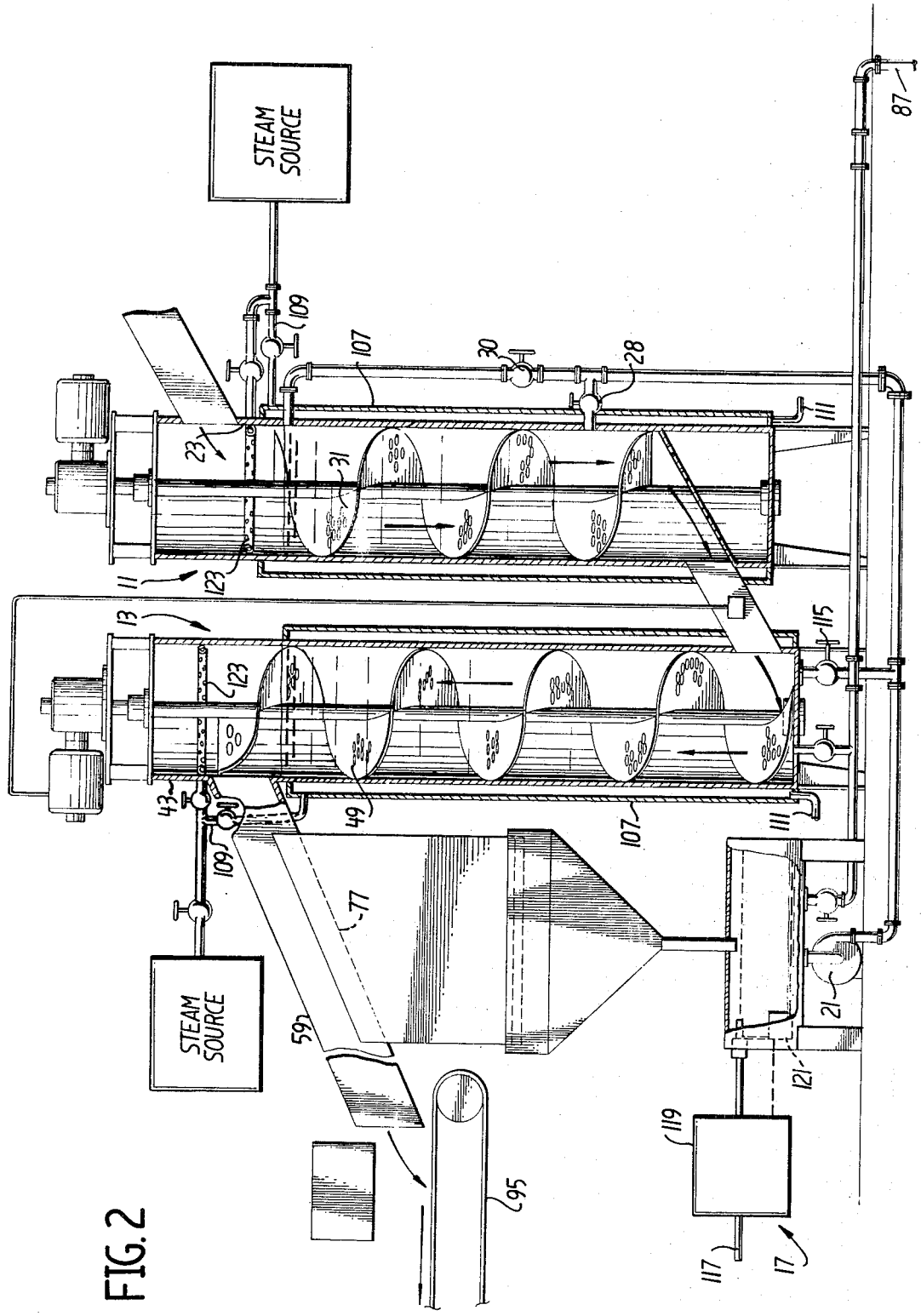
FIG. 2 is a partially cutaway side view of a second embodiment of a conveyor-type cooking device employing principles of this invention.

With reference to the FIG. 2 embodiment, this embodiment is similar to the FIG. 1 embodiment with the major exceptions that it employs a steam-jacket oil heating system in place of the electric oil heater of of FIG. 1 and it eliminates the oil outlet 61 of the FIG. 1 embodiment.

With regard to the steam-jacket oil-heating system, steam jackets 107 encircle the first and second cooking tanks 23 and 43. Steam is continuously fed into these steam jackets through inlet lines 109 and out through steam outlets 111. The steam maintains the oil in the first and second cooking tanks 23 and 43 at desired temperatures.

With regard to elimination of the oil outlet 61 of the FIG. 1 embodiment, in the FIG. 2 embodiment both peanuts and oil leave the second cooking tank 43 via the peanut-outlet chute 59. Most of this oil falls through the perforate chute bottom 77, as did some of the oil during operation of the FIG. 1 embodiment, and falls into the reclaim tank 17. Oil is then pumped from the reclaim tank 17, by means of a single pump 21, directly to the first and second cooking tanks 23 and 43. In this regard, oil flow into these tanks can be regulated by means of the first tank top valve 30, the first tank bottom valve 28, and a second tank valve 115. It is noted that a higher rate of oil flow is required in the second tank 43 than in the first tank 23.

Peanuts passing through the peanut outlet chute 59 to the peanut conveyor belt 95 carry with them some oil and, of course, this oil must be replaced in the oil system. In this regard, oil is fed into the oil reclaim tank 17 by means of a line 117 and a control valve 119 which responds to an oil-level float 121.

A refinement of the FIG. 2 embodiment is the inclusion of steam cleaners 123, which are mounted inside the first and second cooking tanks 23 and 43. Steam injected in the cooking tanks via these cleaners can be used to clean the tanks. The steam is carried off by the drain 87.

Basically the device of FIG. 2 operates as does the device of FIG. 1 with the main exception that oil does not flow to a separate heater, as it does in the FIG. 1 embodiment, and oil does not flow from the second cooking tank 43 through a separate drain, as it does in the FIG. 1 embodiment.

It should be noted that the speed at which peanuts are conveyed through the first and second cooking tanks 23 and 43 is dependent upon the rate at which the downwardly and upwardly conveying augers 31 and 49 are turned. Inasmuch as the flowing oil passes through the perforations 37 and 65 in the augers 31 and 49, the flowing oil does not significantly increase the rate at which peanuts are conveyed; however, it does aid the augers 31 and 49 in conveying the peanuts.

It will be understood by those skilled in the art that the apparatus described herein occupies smaller floor areas than many prior art conveyor type cookers because the first and second auger systems 11 and 13 thereof are vertically oriented rather than being horizontal, or inclined to the vertical, as are most prior art conveyor-type cookers. It is possible to orient applicant's auger systems vertically because oil flow helps the downwardly and upwardly conveying augers 31 and 49 convey the peanuts, especially the upwardly conveying auger 49. In this regard, oil flow is not as significant a factor in conveying the peanuts downwardly as in conveying the peanuts upwardly because gravity aids in conveying them downwardly but impedes in conveying them upwardly.

It should also be noted that the conveyor-type cooking devices described herein can cook at unusually high volume rates because the paths followed by peanuts through the cooking oil therein are relatively long; thus, the peanuts can be conveyed along the paths at a faster rates than in many prior-art conveyor-type cooking devices. The cooking paths in applicant's devices are relatively long because they include both downwardly and upwardly conveying systems rather than merely one-directional conveying systems. Further, since applicant's augers are vertically oriented, and associated tanks closely enclose the augers, the auger systems can be somewhat long without occupying unduly large amounts of space.

Still another advantage of applicant's conveyor-type cooking apparatus is that the monitoring device 66 monitors peanuts while they are being cooked and regulates the degree to which the peanuts are thereafter cooked. This is different from the prior art devices which monitor peanuts only after they are fully cooked.

Yet another advantage of applicant's apparatus is that they do not break or split peanuts into "halfs" to the extent that many prior art conveyor-type cookers do. In this regard, oil flow aids the downwardly and upwardly conveying augers 31 and 49 in conveying peanuts; thus, the peanuts are handled more gently than by some prior-art cookers, thereby reducing breakage thereof.

It should also be appreciated that because the cooking oil utilized in applicant's apparatus is continually circulated it can be relatively easily filtered and cleaned. By continually cleaning the oil, the oil can be used for longer periods of time than with some prior art cookers. Further, it appears to be possible to leave such thusly cleaned oil on peanuts exiting through the peanut outlet chute 59, to thereby serve as an oil residue on the peanuts for eating purposes. This is in contrast to most prior art devices which normally require drying the cooking oil from the peanuts and then applying a new coat of oil to the peanuts for eating purposes.

While the invention has been particularly shown and described with reference to perferred embodiments, it will be understood by those skilled in the art that various changes in form and detail may be made therein without departing from the spirit and scope of the invention. For example, various pressure safety valves and control mechanisms can be utilized with applicant's device.

In addition, the oil could be heated using various types of energy such as gas or heating oil.

Further, although the invention has been described with reference to cooking peanuts, it could also be used to cook other articles.

In addition, it would be possible to design a conveyor-type cooking device employing principles of this invention wherein only the vane of the upwardly conveying auger 49 is perforate, as opposed to the vane of both the downwardly and upwardly conveying augers 31 and 49 being perforate.

It would also be possible to place a drain valve at the bottom of the first cooking tank 23 similar to the drain valve 91 at the bottom of the second cooking tank 43.

The embodiments of the invention in which an exclusive property or privilege is claimed are defined as follows:

I claim:

1. A cooker of the type which receives articles to be cooked from a supply means, conveys the articles in a heated cooking liquid, and delivers the articles to a cooked-article receiving means, comprising:

a downwardly conveying auger system for receiving articles to be cooked from said supply means and conveying said articles along a downward path in said heated liquid, said downward conveying auger system comprising a first cylindrical tank having a downwardly conveying auger mounted snugly therein for rotation in a direction to convey articles in said first cylindrical tank downwardly and said first cylindrical tank defining an inlet port at an upper portion thereof for receiving said articles and an outlet port at a lower portion thereof for discharging said articles;

an upwardly conveying auger system serially connected to said downwardly conveying auger system for receiving said articles from said downwardly conveying auger system, conveying said articles along an upward path in said heated liquid and delivering said articles to said cooked-article receiving means, said upwardly conveying auger system comprising a second cylindrical tank having an upwardly-conveying auger with perforate vanes mounted snugly therein for rotation in a direction to convey articles in said second cylindrical tank upwardly and said second cylindrical tank defining an inlet port at a lower portion thereof for receiving said articles and an outlet port at an upper end thereof for discharging said articles to said cooked article receiving means;

a connecting-duct means for respectively connecting said first and second cylindrical-tank outlet and inlet ports;

a cooking-liquid circulating means comprising a conduit means connected between an upper portion of said second cylindrical tank and said first cylindrical tank and a pumping means for causing liquid to flow through said conduit means from said upper portion of said second cylindrical tank to said first cylindrical tank and through said connecting-duct means and said second cylindrical tank back to said upper portion of said second cylindrical tank at a flow rate which combines with the rates of rotation of said downwardly and upwardly conveying augers to provide gentle handling of said articles; and a heating means for heating said cooking liquid;

whereby a liquid flow is created for aiding in transferring said articles from said downwardly-conveying auger system to said upwardly-conveying auger system and in conveying said articles upwardly through said second cylindrical tank.

2. A cooker as claimed in claim 1 wherein said conduit means is connected to a lower portion of said first cylindrical tank so that liquid flows from said conduit means into the lower portion of said first cylindrical tank.

3. A cooker as claimed in claim 1 wherein said conduit means is connected to an upper portion of said first cylindrical tank so that cooking liquid flows into said upper portion of said first cylindrical tank and, wherein, said first auger has perforate vanes through which said cooking liquid can flow downwardly in said first cylindrical tank.

4. A cooker as claimed in claim 3 wherein said conduit means is connected to both said upper and a lower portions of said first cylindrical tank so that cooking liquid flows into both said upper and lower portions of said first cylindrical tank.

5. A cooker as claimed in claim 4 wherein said conduit means includes valves for controlling liquid flow respectively to said upper and lower portions of said first cylindrical tank.

6. A cooker as claimed in claim 1 wherein there is further included a monitoring means for monitoring articles after they have been conveyed by said downwardly conveying auger but before they are conveyed by said upwardly conveying auger and for controlling the speed at which said upwardly-conveying auger rotates in response thereto.

7. A cooker as claimed in claim 1 wherein said heating means heats said cooking liquid in said conduit means.

8. A cooker as claimed in claim 1 wherein said heating means heats said cooking liquid as it flows through said first and second cylindrical tanks.

9. A cooker of the type which receives articles to be cooked from a supply means, conveys the articles in a heated cooking liquid, and delivers said articles to a cooked article receiving means comprising:

a first conveying system for receiving articles to be cooked from said supply means and conveying said articles along a first path in said heated liquid at a fixed rate of speed;

a second conveying system serially connected to said first conveying system for receiving articles from said first conveying system, conveying said articles along a second path in said heated liquid, and delivering said articles to a cooked article receiving means; and a transferring means for transferring said articles from said first conveying system to said second conveying system, said transferring means including a monitoring means for monitoring the degree to which said articles are cooked and for controlling the rate at which said second conveying system conveys.

10. A cooker as claimed in claim 9 wherein said monitoring means comprises a photocell for measuring the light reflected from said articles.

11. A cooker of the type which receives articles to be cooked from a supply means, conveys the articles in a heated cooking liquid, delivers said articles to a cooked-article receiving means, comprising:

an upwardly conveying auger system for receiving said articles and conveying said articles vertically in said heated liquid, said upwardly conveying auger system comprising a vertically oriented cylindrical tank having a vertically-oriented upwardly-conveying auger with perforate vanes mounted snugly therein for rotation in a direction to convey articles in said cylindrical tank vertically and said cylindrical tank defining an inlet port at a lower end thereof for receiving said articles and an outlet port at an upper end thereof for discharging said articles to said cooked-article receiving means;

a cooking-liquid circulating means comprising conduit means connected between an upper portion and a lower portion of said cylindrical tank and a pumping means for causing liquid to flow through said conduit means in a direction such that cooking liquid flows vertically in said cylindrical tank at a flow rate which combines with the rate of rotation of said upwardly conveying auger to provide gentle lifting of said articles;

a heating means for heating said cooking fluid;

whereby a fluid flow is created for conveying said articles upwardly through said cylindrical tank.

* * * * *